United States Patent [19]

Lucas

[11] 4,323,880
[45] Apr. 6, 1982

[54] AUTOMATIC TARGET SCREENING

[75] Inventor: Bruce T. Lucas, China Lake, Calif.

[73] Assignee: The United States of America as represented by the Secretary of the Navy, Washington, D.C.

[21] Appl. No.: 490,431

[22] Filed: Jul. 22, 1974

[51] Int. Cl.³ .......................... G06K 9/36; G06K 9/62
[52] U.S. Cl. .................. 340/146.3 AC; 340/146.3 Q; 340/146.3 H
[58] Field of Search ................. 340/146.3 Q, 146.3 H, 340/146.3 AC, 146.3 AE, 146.3 AH

[56] References Cited

U.S. PATENT DOCUMENTS

| | | | |
|---|---|---|---|
| 3,504,342 | 3/1970 | Scarrott et al. | 340/146.3 AH |
| 3,576,980 | 5/1971 | Doyle | 340/146.3 AE |
| 3,638,188 | 1/1972 | Pincoffs | 340/146.3 AC |
| 3,748,644 | 7/1973 | Tisdale | 340/146.3 H |
| 3,801,775 | 4/1974 | Acker | 340/146.3 H |

Primary Examiner—Howard A. Birmiel
Attorney, Agent, or Firm—Robert F. Beers; W. Thom Skeer; Robert W. Adams

[57] ABSTRACT

A feature extraction and selection technique for the recognition of characteristics identified with man-made objects within a scene of natural terrain, wherein the frequency of occurrence of the features is plotted in the form of three-dimensional histograms which describe the features of man-made objects, such as straight edges and regular geometric shapes. Employing conventional pattern recognition techniques, these features are used to classify the imagery as man-made or non man-made.

6 Claims, 5 Drawing Figures

1 STRAIGHT LINE SIGNATURE
2 RIGHT ANGLE SIGNATURE
3 PARALLEL LINE SIGNATURE
4 CIRCLE SIGNATURE

1 STRAIGHT LINE SIGNATURE (AIRCRAFT)
2 SOME PARALLEL LINE SIGNATURES
3 CIRCLE SIGNATURE (B)

(A)

AUTOMATIC TARGET SCREENING

BACKGROUND OF THE INVENTION

In the field of aircraft reconnaissance where an area of terrain is surveyed for the detection of military invasion and the identification of possible targets of interest, prior techniques have been either ineffectual or inefficient. With prior systems the pilot/operator must constantly view the display of single or multiple sensors for extraction of intelligence information. The high rate at which the data are presented to him, the total volume of data, and the presence of irrelevant information severely impede his target-detection performance.

Prior to the present invention there has been no apparatus or technique available to sense and automatically identify that portion of the available scene having the greatest probability of including a man-made object. The present invention accomplishes that identification, and permits the operator to restrict further investigation to the areas identified.

SUMMARY OF THE INVENTION

The present invention results in a separation of imagery into two catagories. The first being images containing man-made objects. The part of the imagery selected by the present invention contains man-made objects such as vehicles, buildings, roads, bridges and runways which could be targets of primary military interest. The rejected part of the imagery contains only terrain features such as fields, rivers, etc.

The scene under surveillance is sensed by any of a number of available sensors, the selection of which may be controlled by a computer. The data from the various sensors are converted in a scan converter to the required scan pattern, and buffered to adapt the data rate to the processing speed of the computer. A coder performs a mathematical codification of the objects in the imagery to be screened, which information is presented to a classifier using memory stored data that describes in coded form the features of man-made objects such as straight edges, sharp corners, rectangular shapes, etc. A decision is then made by the classifier by evaluating linear discriminant functions using circuitry, the real-time data and the pre-stored data. Then, the imagery having the great probability of containing objects of potential interest is selected for further evaluation, or transmission via data link for further analysis.

The scene under surveillance is imaged by a sensor, and the image is scanned to abstract its information. A three-dimensional phase histogram is constructed from the information obtained in the following manner: for every pair of scan positions, the angles each of the gradient vectors make with a line joining the two points are calculated. The angles are measured from the gradient vectors counterclockwise to the line joining the points.

If $\hat{g}_1$ and $\hat{g}_2$ are unit vectors along the gradient directions and $\hat{r}_1$ and $\hat{r}_2$ are unit vectors directed along the line joining the points the angles $\theta_1$ and $\theta_2$ may be obtained from the relations:

$$\hat{g}_1 \times \hat{r}_1 = \sin\theta_1 \, k$$

$$= \left( \frac{Y_2 - Y_1}{r} \cos\phi_1 - \frac{X_2 - X_1}{r} \sin\phi_1 \right) k$$

$$\hat{g}_2 \times \hat{r}_2 = \sin\theta_2 \, k$$

$$= -\left( \frac{Y_2 - Y_1}{r} \cos\phi_2 + \frac{X_2 - X_1}{r} \sin\phi_2 \right) k$$

$$\hat{g}_1 \cdot \hat{r}_1 = \cos\theta_1$$

$$= \frac{X_2 - X_1}{r} \cos\phi_1 + \frac{Y_2 - Y_1}{r} \sin\phi_1$$

$$\hat{g}_2 \cdot \hat{r}_2 = \cos\theta_2$$

$$= -\frac{X_2 - X_1}{r} \cos\phi_2 - \frac{Y_2 - Y_1}{r} \sin\phi_2$$

where $\phi_1$ and $\phi_2$ are the measured gradient angles (or phase angles) and r is the separation of the points. The average and absolute difference, $$\theta_A = \frac{\theta_1 + \theta_2}{2}$$

$$\theta_D = |\theta_1 - \theta_2|$$

are then calculated. These two angles, $\theta_A$ and $\theta_D$, are used to generate a three-dimensional phase histogram, wherein the value of the histogram at coordinates $(\theta_A, \theta_D)$ is proportional to the probability of occurrence of this pair of angles. This image coding technique is invariant to translation in rotation, and to scale change if the histogram is properly normalized.

If the angles $\theta_A$ and $\theta_D$ are calculated to 1° accuracy, and if they may vary through 360°, the resulting 360×360 array would be prohibitively large. The array may be reduced to a manageable size by reducing the angular resolution by a factor of 10 before the histogram is generated. If additional reduction is desired for feature extractions, the angular resolution may be additionally reduced by a factor of 4, for example.

The resulting histogram is classified using the memory stored data in an appropriately programmed computer or hard-wired classifier to determine the presence or absence of man-made objects within the scene under investigation. That determination is then conveyed to the operator.

The basic technique of the present invention is to find $\theta_A$ and $\theta_D$, construct a three-dimensional histogram therefrom, and classify the histogram using pre-stored reference data describing the features associated with man-made objects. Appropriately programmed computers, or their hard-wired counterparts, are necessary to calculate $\theta_A$ and $\theta_D$, construct the histograms, and classify them, using the memory stored data. Given the equations above, and the knowledge within the field of pattern recognition, programs which would achieve an operable embodiment of the herein disclosed present invention are within the present state of the art.

DESCRIPTION OF THE PREFERRED EMBODIMENT

Figure 1:
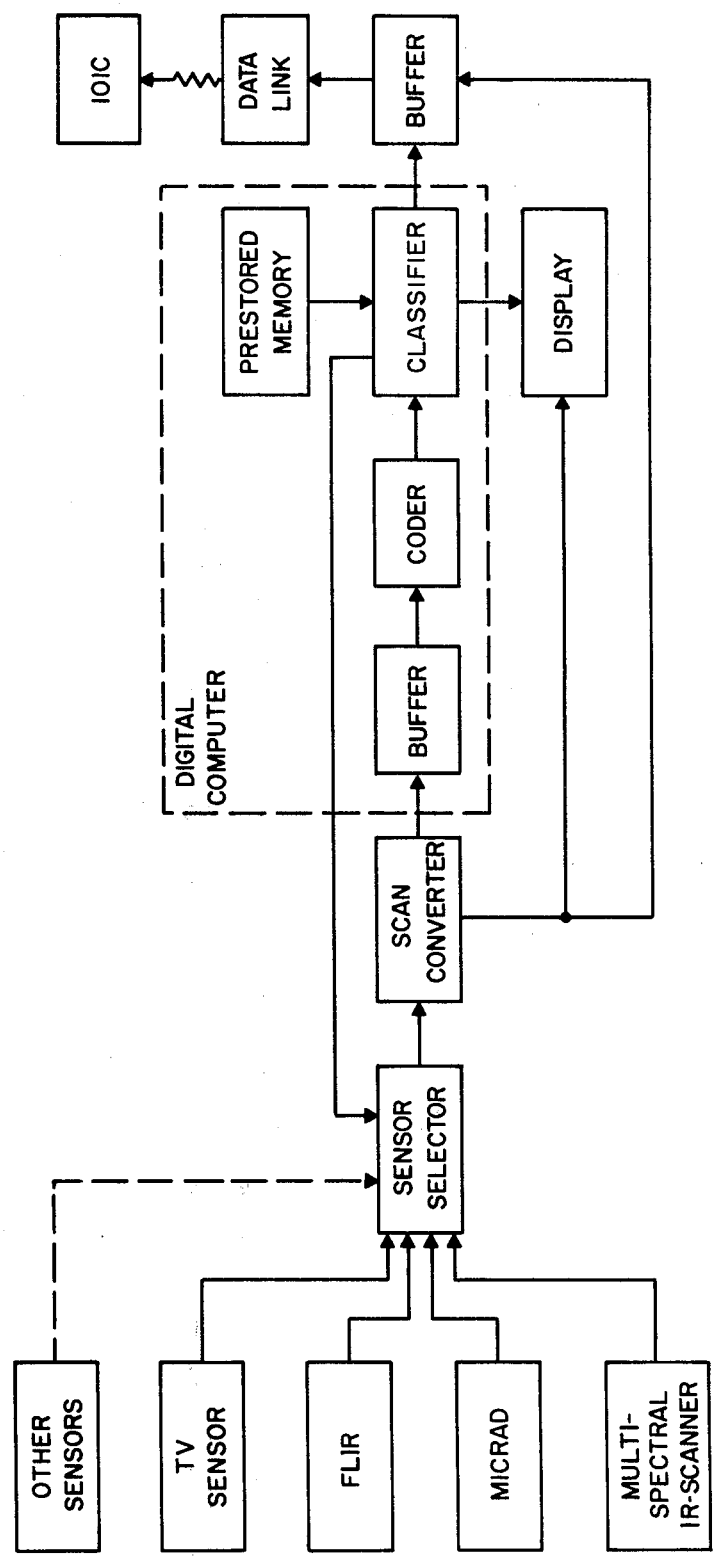
FIG. 1 is a block diagram of a preferred embodiment of the present invention for airborne display and/or data transmission.

FIG. 1 shows the preferred embodiment of automatic target screening for airborne display and data transmission.

As shown in FIG. 1, automatic target screening for airborne display and data transmission will be performed in the following manner:

The data from the various sensors is entered into the system through a sensor selector, which is controlled by the computer, and a scan converter. The data from the various sensors are converted in the scan converter to the required scan pattern and buffered to adapt the data rate to the processing speed of the computer. The coder performs a mathematical codification of the objects in the imagery to be screened. This information is presented to the classifier using the data stored in the memory that describe in coded form the features of man-made objects such as straight edges, sharp corners, rectangular shapes, etc. A decision is made by evaluating linear discriminant functions using the real-time data and the pre-stored data. After the imagery containing objects of potential interest has been selected this information may be buffered and transmitted via data link for further analysis by photo interpreters.

The classifier also controls the display and the sensor selector so that only sensor information containing objects of interest is displayed, all natural terrain features are suppressed, and man-made objects are enhanced and their location marked. The output of the classifier can also be used to direct high resolution, narrow field-of-view sensors to objects of military interest.

Automatic target screening may be employed for ground based photo interpretation. The film or tape received from reconnaissance missions would be read by either a flying spot scanner or a tape reader. The signal processing part is identical to that in FIG. 1 with the exception of some simplifications. The output of the classifier can be used to turn on the viewer to view selected film frames, and the reader output can be buffered and fed to a printer so that a hard copy of imagery containing man-made objects is immediately available. The image can also be analyzed by an interpreter on a TV display, with the classifier supplying image enhancement for man-made objects and marking their location.

Figure 2:
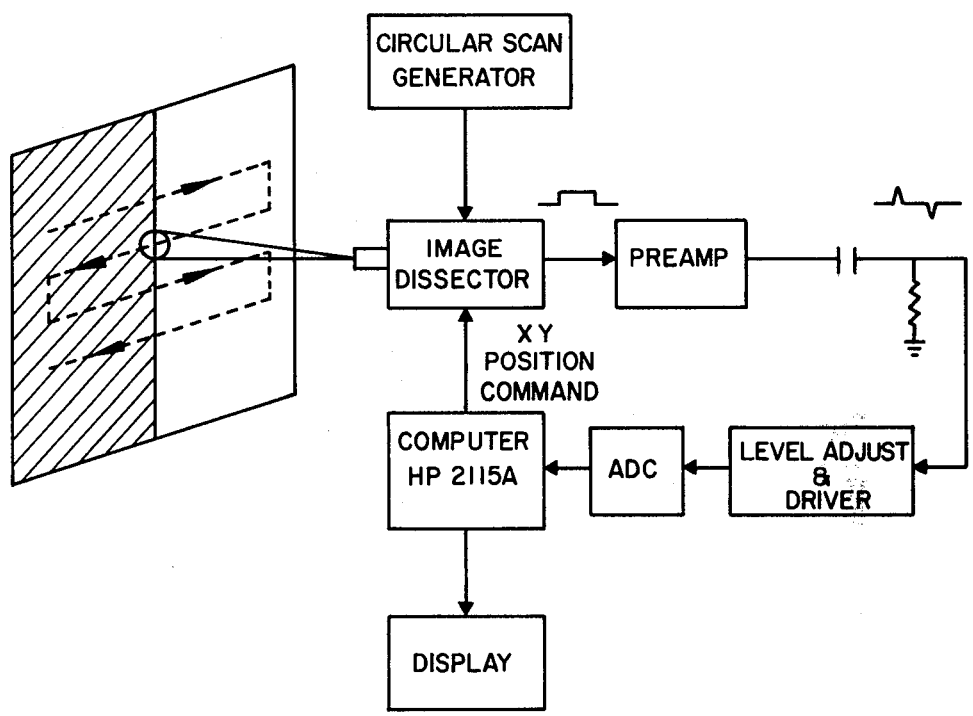
FIG. 2 is a simplified block diagram of the image codification technique of the present invention or a circular scan system.

A basic feature of the present invention is the mathematical codification of the objects to be screened. A simplified block diagram of the codification system is shown in FIG. 2. The image or scene is scanned in, for example, a pattern consisting of a small circle whose center moves over the scene in a raster format. The sensor used for that investigation may be an image dissector. The diameter of the circle is adjusted to be compatible with the scene detail and with the intrinsic resolution of the sensor. The resulting video is amplified and differentiated through an RC network with a short time constant. For one example, the video is then digitized into 15 gray levels and read into a general-purpose computer. Each circular scan cycle results in 48 data elements that are modulated by sine and cosine functions and summed. The two resulting sums are then used to calculate a phase angle, which is the direction of the scene gradient at the point on the scene corresponding to the center of the circle.

While scanning the image, each phase angle and its associated scan coordinates are calculated and stored in memory, provided that certain contrast threshold and edge continuity requirements are met. Contrast thresholding is simply the process of requiring the differentiated digitized video be greater (in absolute value) than a certain level before it is used in calculating the sine and cosine sums. Edge continuity requires that the edge intersect the scan circle twice. This is accomplished by processing the positive and negative components of the digitized video separately.

Figure 3:
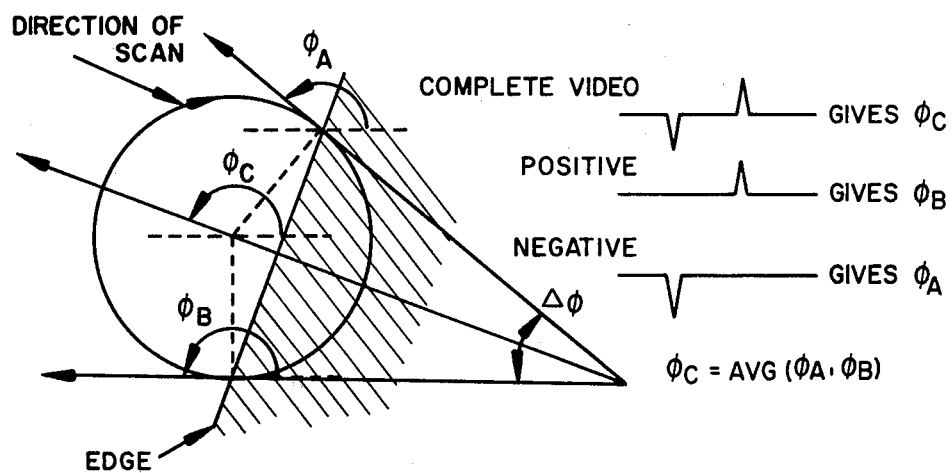
FIG. 3 is a schematic diagram showing the technique employed for obtaining the phase angle of the normal to an edge in the image for a circular scan system.

Referring to FIG. 3, the complete video for one scan cycle of a circular scan system yields the phase angle $\phi_C$, which is the correct orientation of the normal to the edge. The positive and negative components of the video processed separately yield phase angles, $\phi_B$ and $\phi_A$, respectively. The average of these two angles again gives $\phi_C$. Obviously, if the edge passes through the center of the circle, $\phi_A = \phi_B = \phi_C$.

To ensure that the edge intersects the circle twice, two criteria must be satisfied. First, neither the positive nor the negative components of the video can lie completely below the threshold. Thus, if both the sine and cosine sums of either the positive or negative components are zero, all the data for this particular scan point are rejected. Second, if the threshold requirement is satisfied for both components and $\phi_A$ and $\phi_B$ are calculated, the difference $\nabla \phi = |\phi A - \phi B|$ must be less than some predetermined value. The edge continuity requirement discriminates against large noise transients that might otherwise be interpreted as edge crossings.

In addition to the contrast and continuity criteria, the amount of data may be also further reduced by requiring that three consecutive scans yield phase angles that differ by less than a predetermined amount. Although storage limitations restrict the angle coordinate pairs that may be handled, the thresholding requirements limit the actual number of data elements available to less than this in most cases.

The phase histogram is obtained as described above in the Summary of Invention. The reduced three-dimensional histogram, described above, provides 49 potentially useful features. Extreme care must be exercised in using high dimensional spaces when a number of samples is limited. It has been shown that failure to heed this precaution can lead to some rather surprising and misleading results. For instance, it is possible to effect a complete class separation of a set of samples even if the set is generated from random noise. As a result, it is suggested that the number of samples exceed the number of features by at least a factor of 3 to 5.

Figure 4:
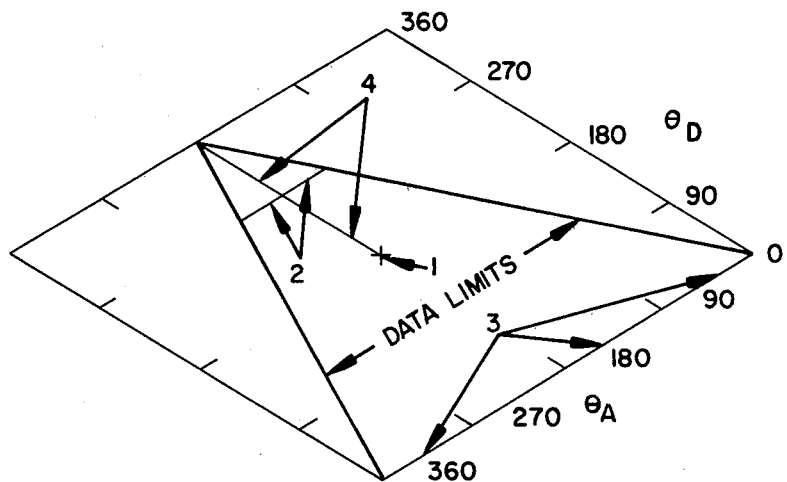
FIG. 4 is a plan view of signatures of representative characteristics of man-made objects.
Figure 5:
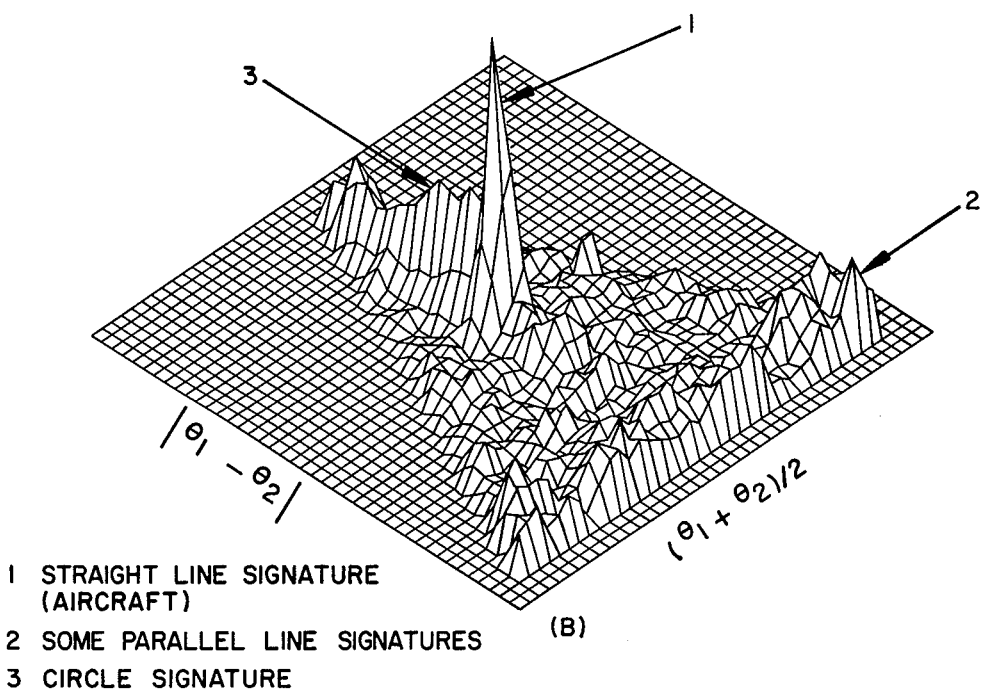
FIG. 5 is an example of a histogram provided by a preferred embodiment of the present invention.
Figure 5:
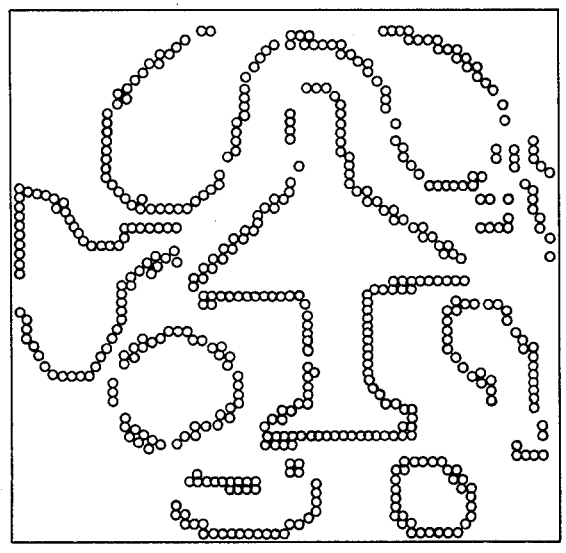

A natural choice for a feature would be the histogram matrix element centered at $\theta_D = \theta_A = 180°$ since this indicates the straight-line content of an image (see FIG. 4). The usefulness of this feature is based upon that fact that man-made objects have a higher straight-line content than natural objects. In the examples described, 8 other features consisting of matrix elements in a 3×3 neighborhood about the 180, 180 position were chosen, primarily upon the observation that this region exhibits the most distinct differences when comparing the histograms for the man-made and natural-object classes. Another region showing distinctive characteristics consisted of the column of elements corresponding to $\theta_D = 20$, 60 and 100°. The first of these columns is the parallel line signature, as shown by FIG. 4. Frequency of occurrence histograms are then generated for each of the selected features.

After the features have been selected, the next step is to determine the decision function. The decision function is given by $$D = \sum_{i=1}^{N} W_i Y_i + W_{N+1}$$

where $(Y_1, Y_2, \ldots Y_N)$ is the set of features for a given sample. It is positive if the sample is a member of one class, and negative if it is a member of the other. The set $(W_1, W_2, \ldots W_{N+1})$ is referred to as the weight vector, and the set $(Y_1, W_2, \ldots Y_N, 1)$ as the feature vector. The function given above is the scalar product of the two vectors and is a measure of the correlation between the set of coefficients and the feature set.

The present invention reliably distinguishes between man-made and natural objects, and is particularly useful when the straight-line content of an image is used as the major distinguishing feature. The invariance of the technique to translation, rotation, and scale change allows the number of features needed to uniquely describe a class of objects to be kept reasonably low. Work has indicated that 6 to 10 features may be sufficient. Edge enhancement techniques would be useful when working with imagery that is not of particularly high quality, such as that sometimes produced by side-looking radar and microwave sensors. Specific applications along these lines are ship classifications, change detection, and image cross-correlation.

What is claimed is:

1. A system for recognizing the characteristics of man-made features within a scene of natural terrain, comprising:

sensing means for imaging said scene;

scanning means for scanning the image provided by said sensing means to identify preselected characteristics of man-made features;

means for generating at least one, three-dimensional phase histogram from the images scanned by plotting the probability of occurrence of the average and absolute difference angles that the gradient vectors make with the line joining adjacent points identified during said scan as having a characteristic of man-made features, wherein said gradient vectors are in the direction of said scan and the angles are measured counterclockwise from said gradient vector;

means for comparing said probability with preselected reference characteristics to recognize the scenes within which man-made features have a preselected probability of being present.

2. The system of claim 1 wherein said scanning means includes an image dissector having a size-adjustable, circular scan that is moved across said image in a raster format to provide a plurality of data elements from each circular scan.

3. The system of claim 2 wherein the data elements of each circular scan are modulated by sine and cosine functions, and summed, wherein the sums identify the direction of the scene gradient at the point of the scene corresponding to the center of the circle of the circular scan.

4. The system of claim 3 wherein the direction of the scene gradient and its associated scan coordinates are identified for those scans wherein the data elements have a value greater than a preselected threshold, and the difference between the value of the positive and the negative components of said data elements is less than a preselected maximum, which criteria identify said points as having a characteristic of man-made features.

5. The system of claim 4 wherein said comparing means is a computer programmed with preselected reference characteristics.

6. The system of claim 1 wherein said sensing means includes a plurality of sensors, each of which can be mutually exclusively selected to provide an image to be scanned by said scanning means.

* * * * *